United States Patent [19]

Song et al.

[11] Patent Number: 5,483,525
[45] Date of Patent: Jan. 9, 1996

[54] ASSIGNMENT METHOD AND APPARATUS OF VIRTUAL PATH AND VIRTUAL CHANNEL IDENTIFIERS IN AN ASYNCHRONOUS TRANSFER MODE

[75] Inventors: Deog-Young Song; Seong-Yong Park; Chong-Nam Lee; Byung-Chang Kang, all of Seoul, Rep. of Korea

[73] Assignee: SamSung Electronics Co., Ltd., Suwon, Rep. of Korea

[21] Appl. No.: 265,849

[22] Filed: Jun. 27, 1994

[30] Foreign Application Priority Data

Dec. 30, 1993 [KR] Rep. of Korea ............... 31307/1993

[51] Int. Cl.$^6$ .................................................. H04J 3/26
[52] U.S. Cl. ...................................... 370/60; 370/94.1
[58] Field of Search ...................... 370/60, 60.1, 85.6, 370/94.1, 94.2

[56] References Cited

U.S. PATENT DOCUMENTS

| | | | |
|---|---|---|---|
| 4,890,280 | 12/1989 | Hirata | 370/60 |
| 5,084,867 | 1/1992 | Tachibana et al. | 370/60 |
| 5,136,584 | 8/1992 | Hedlund | 370/94.1 |
| 5,166,926 | 11/1992 | Cisneros et al. | 370/60 |
| 5,173,897 | 12/1992 | Schrodi et al. | 370/60 |
| 5,214,642 | 5/1993 | Kunimoto et al. | 370/82 |
| 5,249,178 | 9/1993 | Kurano et al. | 370/60 |
| 5,253,247 | 10/1993 | Hirose et al. | 370/14 |
| 5,268,896 | 12/1993 | Pauwels | 370/60 |
| 5,278,828 | 1/1994 | Chao | 470/85.6 |
| 5,280,475 | 1/1994 | Yanagi et al. | 370/60 |
| 5,280,483 | 1/1994 | Kamoi et al. | 370/94.1 |
| 5,287,347 | 2/1994 | Spake | 370/60 |
| 5,339,310 | 8/1994 | Taniguchi | 370/60 |

*Primary Examiner*—Melvin Marcelo
*Attorney, Agent, or Firm*—Robert E. Bushnell

[57] ABSTRACT

A method and apparatus for making assignment of virtual path and virtual channel identifiers under a "free status" in an asynchronous transfer mode switching system, at high speed, without delaying a call processing speed of a call processing circuit. The method for assigning virtual path and virtual channel identifiers placed in a cell header area includes the step for setting predetermined header values in a memory having a FIFO function; the step for checking a storage state of the memory when a connection requirement of a call occurs; the step for transferring stored header values to interface circuits corresponding to the connection requirement after the stored header values are read from the memory when the memory is not in an empty state; and the step for storing in the memory the header values used for the call required for a release when a releasing requirement of a call occurs.

22 Claims, 3 Drawing Sheets

ASSIGNMENT METHOD AND APPARATUS OF VIRTUAL PATH AND VIRTUAL CHANNEL IDENTIFIERS IN AN ASYNCHRONOUS TRANSFER MODE

CROSS-REFERENCE TO RELATED APPLICATIONS

This application makes reference to, incorporates the same herein, and claims all benefits incurring under 35 U.S.C. §119 from an application for "Improved Assignment Method And Apparatus Of Virtual Path And Virtual Channel Identifiers In An Asynchronous Transfer Mode" filed in the Korea Industrial Property Office on 30 Dec. 1993 and assigned Ser. No. 1993/31307.

BACKGROUND OF THE INVENTION

1. Technical Field

The present invention relates to an asynchronous transfer mode (hereinafter, referred to as "ATM") switch system, and more particularly, to an improved assignment method and apparatus of a virtual path and virtual channel identifier information in the ATM.

2. Background Art

Generally, ATM is a specific packet-oriented transfer mode using an asynchronous time division multiplexing technique where both line switching and packet switching are unified and many pieces of information such as voice, data, and pictures are organized in fixed-sized blocks, called cells. Thus, ATM can operate as both a packet exchange system and a circuit exchange system in one transmission mode for efficiently embodying both high speed and wide band communication networks. For this reason, ATM is a target transfer mode solution for implementing a broadband integrated services digital network (B-ISDN) in comparison with a conventional synchronous transfer mode (STM) which can only transmit subscribers' information on channels having a fixed band.

In principle, conventional STM is a time position multiplexing scheme in which a channel is identified from a time slot within a frame. In the STM, the time slot occurs periodically regardless of the existence of information transmission. ATM, on the other hand, does not require the allocation of time slots on each terminal. Both the ATM and the STM are similar in the sense that they transmit information in a digital format and provide several channels in a transfer stream for support. There is however, one significant difference between the two systems regarding the method for assigning and identifying information channels. That is, the STM assigns information to be transferred through a fixed channel and identification of the assignment is performed according to relative location of a frame pattern. Thus, in a STM, the band channels are not effectively used because the band channels are continuously assigned even where no information is being transferred. In an ATM, on the other hand, the band channels are assigned only where information to be transmitted occurs; the band channels that are not assigned can be used for information transmission by another subscriber. As a result, ATM offers a more effective channel management. Information channel identification in the ATM is embodied by the virtual path and virtual channel identifiers (hereinafter, referred to as "VPI & VCI") or similar connection identifiers which are placed in a header of each cell for identifying cells belonging to the same virtual channel on an asynchronous time division multiplex. Such channel identification of the ATM facilitates the use of a multiplex, de-multiplex and exchange of digital information, and serves to decrease the costs of broad-band communication network elements as well as providing flexibility in a bandwidth distribution.

In a communication system or switching system using the ATM, a call processing unit placed inside the communication system or the switching system assigns the VPI and VCI values to each ATM cell whenever the subscriber requires a call connection. The assignment of VPI and VCI values is accomplished by reading in order of VPI and VCI values which are not under assignment every time the subscriber requires a call connection, and thereafter, the VPI and VCI values (or numbers), which are predetermined, are stored in a non-volatile memory. A call which receives the assignment of the VPI and VCI placed in a header area of an ATM cell is transferred through a transferring channel. A receiving party analyzes with a header conversion table memory the VPI and VCI values received, then processes a route for the call from a calling party. Header conversion table memory stores the VPI and VCI values for identifying a call and is used in conjunction with a self-routing switch for enabling a call connection between two terminal units to communicate with each other through the ATM switching system by virtue of the combination of VPI and VCI values included in the header area of an ATM cell. The problem is that if the VPI and VCI values for identifying a call are used as addresses for a header conversion table memory, the capacity of the header conversion table memory becomes considerably larger which consequently attributes to delay of call processing speed by the ATM switching system.

For instance, if the length of a VPI field of a cell header is 12 bits and the length of a VCI field is 16 bits used in conjunction with a Network Node Interface (NNI) as recommended by CCITT recommendation I.361, a header conversion table memory in the ATM switching system would require an address capacity of $2^{28}$=256 Mbits. Even in a context of a User Node Interface (UNI) where the length of a VPI field of a cell header is only 8 bits and the length of a VCI field is 16 bits, a header conversion table memory would still require an address capacity of $2^{24}$=16 Mbits. Since the total memory capacity of the header conversion table memory is considerably large, in the order of G bits, the switching operation of the ATM switching system slows down considerably.

One improvement on the conventional VPI and VCI assignment technique is disclosed, for example, in U.S. Pat. No. 5,119,369 for "Packet Switch Communication Network Using Packet Having Virtual Channel Identifier" issued to Tanabe et alii, which envisions to reduce the capacity of the header conversion table memory by using an asymmetrical VCI having a value which differs depending on the direction of transmission of the information ATM cell between two terminal units which communicate with each other, thereby enabling identification of a logical connection between the two terminal units using only the VCI values. As a result, the address capacity of a header conversion table memory for rewriting a header label of a received ATM cell can be limited to the length of a VCI field which is only $2^{16}$=64 Kbits instead of $2^{28}$=256 Mbits or even $2^{24}$=16 Mbits. The sequential assignment of the VPI and VCI values in the header area of the ATM cell still however prolongs a call processing speed of a call processing unit since the call processing unit has to search for the VPI and VCI values under a "free status" (i.e., a current unused condition or release condition) whenever little call connection is required. In the initial operation for assigning the VPI and VCI values in a cell header, there is a substantial problem associated with the sequential assignment of the VPI and VCI values in response to a connection requirement specified by a call. After all the VPI and VCI values are assigned from the beginning to the end of the relevant range however, the call processing unit must hunt for a VPI and VCI value that is under a "free status." For example, if the relevant range of VPI and VCI values within a cell header is 24 bits in conjunction with a User Network Interface (UNI), or 28 bits in conjunction with a Network Node Interface (NNI), the call processing unit must check up to a total of $2^{24}=16$ Mbits or $2^{28}=256$ Mbits address locations in the header conversion table in order to seek for the VPI and VCI values under a "free status." Consequently, a call processing speed of the call processing unit suffers as a result of such checking operation. As described above, the sequential assignment of VPI and VCI values in the conventional ATM switching system slows down the call processing speed of a call processing unit which negates any recent improvements made on the call processing speed.

There are other techniques for improving the switching ability of a data switching system such as, for example, in U.S. Pat. No. 4,890,280 for "Frame Relay Type Data Switching Apparatus" issued to Hirata, which endeavors to reduce the number of times of memory access and allows header updating to be executed with no regard to the capacity of a call processing unit, thereby enhancing the switching ability. In Hirata '280, the data switching system separates header data from an incoming communication channel and compares the separated header data with incoming channel numbers while communication data is temporarily stored in a first-in-first-out memory in order to subsequently combine outgoing channel numbers with stored communication data to provide channel data for an outgoing communication channel. In order to separate header data from the incoming communication channel, a call processing unit would still search for VPI and VCI values under a "free status," which would inevitably prolong a call processing speed. Thus, the data switching system as disclosed by Hirata '280 still suffers the same deficiency as that of Tanabe et al. '369.

SUMMARY OF THE INVENTION

It is therefore, one object of the present invention to provide a method and apparatus for efficiently assigning VPI and VCI values under a "free status" in a header area of an ATM cell to solve the above-mentioned problems.

It is another object of the present invention to provide a method and apparatus for making assignment of VPI and VCI values in a header area of an ATM cell to enhance a call processing speed for transferring a call in an ATM switching system.

It is yet another object of the present invention to provide a method and apparatus capable of searching for VPI and VCI values under a "free status," at high speed, in an ATM switching system for assignment in a header area of an ATM cell without burdening a call processing unit.

A method for assigning VPI and VCI values in a header area of an ATM cell in accordance with one aspect of the present invention includes the step for setting predetermined values of header information in a memory having a first-in-first-out (FIFO) function; the step for checking a storage status of the memory when a connection requirement of a call occurs; the step for transferring header values to an interface corresponding to a connection requirement after reading the header values from the memory when the storage status of the memory is not in an empty state; and the step for storing in the memory the header values used for a call to be released when a releasing requirement of the call occurs.

An apparatus in accordance with another aspect of the present invention includes a line interface part for interfacing with a plurality of subscriber lines from corresponding subscriber terminals; a trunk interface part each for interfacing with a plurality of trunk lines from a communication channel; an asynchronous transfer mode switch part having a plurality of pairs of input and output lines operatively connected between the line interface part and the trunk interface part, for selectively switching between subscriber lines for enabling inter-terminal communication between of subscribers, and for enabling communication with another broadband communication system via the communication channel; and a header assignment circuit for assigning, in correspondence with a connection requirement specified by a call, header values to be placed in a header area of asynchronous transfer mode cells. The header assignment circuit as contemplated by the present invention comprises a memory having a first-in-first-out function, for storing header values in response to a write control signal and for outputting stored header values in response to a read control signal; a call control part operatively connected between the line interface part and the trunk interface part, for generating the write control signal and a first clock signal in response to a releasing requirement of a call for enabling the header values to be written onto the memory, and for generating the read control signal and a second clock signal in response to the connection requirement from one of the line interface part and the trunk interface part for enabling the header values to be read from the memory to one of said line interface part and the trunk interface part, one of the line interface part and the trunk interface part being able to receive and apply the header values read from the memory in the header area of the asynchronous transfer mode cells; a first latch for latching the header values to be written onto the memory in response to the first clock signal; and a second latch for latching the header values read from the memory in response to the second clock signal.

According to the present invention as described above, there is no need to search for the VPI and VCI values under a "free status" since the VPI and VCI values under a "free status" are read in a sequential order as they were written in a FIFO memory depending on the designed characteristics and capabilities of the FIFO memory, thereby vastly improving a call processing speed of the call processing unit.

BRIEF DESCRIPTION OF THE DRAWINGS

A more complete appreciation of this invention, and many of the attendant advantages thereof, will be apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

The following description of an apparatus and method for assigning virtual path identifiers (VPI) and virtual channel identifiers (VCI) according to the preferred embodiments of the present invention is merely exemplary in nature and is in no way intended to limit the invention or its application or uses. Further, in the following description, numerous specific details for types of such apparatus are set forth to provide a more thorough understanding of the present invention. It will be apparent, however, to one skilled in the art, that the present invention may be practiced without these specific details. In other instances, characteristics and functions of the well known circuits have not been described so as not to obscure the present invention.

Figure 1:
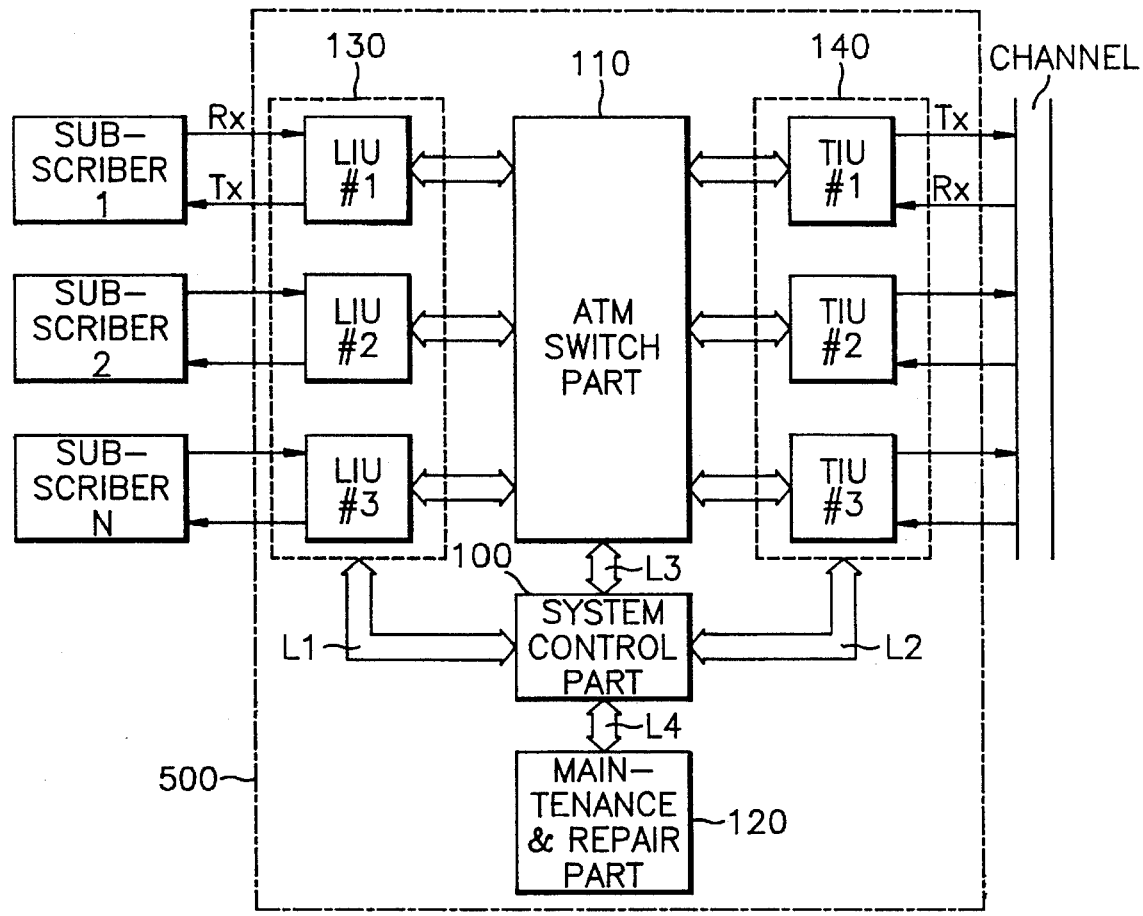
FIG. 1 is a block diagram describing a structure of an asynchronous transfer mode (ATM) switching system according to the present invention.

Turning now to FIG. 1, FIG. 1 illustrates a circuit structure of an asynchronous transfer mode (ATM) switching system applicable to the present invention. ATM switching system 500 includes a system control part 100, an ATM switch part 110, a maintenance and repair part 120, a line interface part 130 and a trunk interface part 140, for transferring calls generated from any one of subscribers to another ATM switching system through an ATM channel and for connecting a call received through the ATM channel to any one of the subscribers. System control part 100 controls a whole exchanging operation of the ATM switching system 500 and enables communication with a controller placed within the line and trunk interface parts 130 and 140. System control part 100 also performs a call admission control function (CAC) for determining whether to admit a call from a subscriber terminal, requesting a connection through a transmission line to another subscriber terminal, based on described parameters representative of attributes of the requesting call, i.e., the calling subscriber terminal, such as service bandwidth, transfer delay, cell loss rate, peak speed of data, average speed of data, burst ratio and so forth. Upon admittance of a call, the system control part 100 further performs a congestion control function (CC) for determining whether congestion of traffic occurs in order to maintain the service quality within the described parameters. In addition, the system control part 100 assigns virtual path identifiers (VPI) and virtual channel identifiers (VCI) in a header area of an ATM cell which is the principal object of the present invention. Assignment of the VPI and VCI in a header area of an ATM cell is dependent upon its bandwidth and a connection requirement of a call. System control part 100 is electrically connected to the ATM switch part 110, the maintenance and repair part 120, the line interface part 130 and the trunk interface part 140 through transmission lines L1 to L4, for exchanging data as well as generating control signals to the respective line interface part 130, trunk interface part 140, ATM switch part 110 and the maintenance and repair part 120.

ATM switch part 110 is used to execute a switching function of the ATM cell in response to control signals provided from the system control part 100. The ATM switch part 110 as contemplated by the invention is comprised of a time division switch and a space division switch; and a total switching number within the ATM switch part 110 is set to correspond to the number of subscribers, trunks within the trunk interface part 140 and others ports.

Maintenance and repair part 120 is used to execute a whole management, maintenance and repair function under control of the system control part 100. The maintenance and repair function includes checking the status of transmission lines, detecting transmission errors and making a hindrance recovery. In connection with the ATM function, resource management of ATM cells and data base management of subscribers are also included in order to facilitate the operation of an ATM switching system.

Line interface part 130 consists of a plurality of lines interface units (LIU#1–LIU#N) coupled to a corresponding plurality of subscriber terminals 1, 2 . . . N, for connecting between a plurality of subscriber lines from subscriber terminals 1, 2 . . . N via the ATM switch part 110. Thus, the line interface part 130 enables inter-terminal communication between subscribers within an ATM switching system. In addition, the line interface part 130 also performs a number of well-known functions according to an ATM physical dependent layer, and an ATM layer that is common to all services with cell transfer capabilities, as well as an ATM adaptation layer (AAL) that is service-dependent. Further, the line interface part 130 performs an usage parameter control function (UPC) for monitoring whether a subscriber is transmitting information in connection with the call on the basis of parameter values set by the subscriber when the control admission control function (CAC) is performed.

Trunk interface part 140 consists of a plurality of trunk interface units (TIU#1–TIU#L) coupled to an ATM channel via a plurality of trunk lines, for connecting ATM cells of another switching system through the ATM channel. Thus, the trunk interface part 140 enables communication between two different ATM switching systems via an ATM switch part 110.

As described in FIG. 1, the system control part 100 performs the function of assigning header information having VPI and VCI values with regard to the bandwidth in response to a connection requirement of a call. In accordance with the present invention, the burden of the system control part 100 is reduced by simply and directly assigning the VPI and VCI values without searching for the VPI and VCI values under a "free status." An apparatus as shown in FIG. 2 may be installed inside or on the outside of the system control part 100 in order to implement the assignment operation according to the principle of the present invention.

Figure 2:
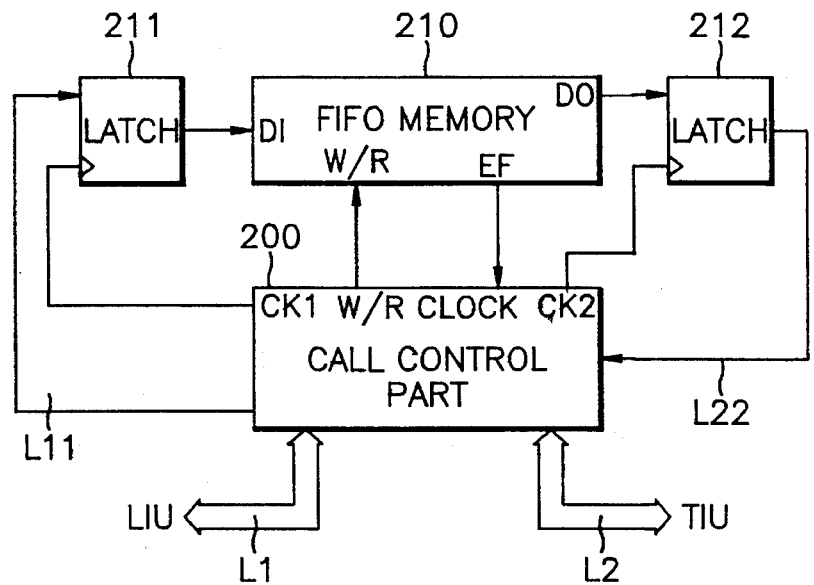
FIG. 2 is a block diagram performing a virtual path identifier (VPI) and virtual channel identifier (VCI) assignment according to one embodiment of the present invention.

Referring now to FIG. 2, FIG. 2 illustrates a block circuit diagram of an assignment circuit for assigning VPI and VCI values in a header area of an ATM cell according to one embodiment of the present invention. The assignment circuit includes a call control part 200, a FIFO memory 210, and latch circuits 211 and 212. The call control part 200 can be a main control part placed inside the system control part 100 of FIG. 1. Alternatively, it can also be arranged as a central processing unit (CPU) of the system control part 100. For example, the call control part 200 may be selected from any one model of the "68030" microprocessor series designed by Motorola, a U.S. Company, if it is designed to be electrically compatible when used in conjunction with the system control part 100. In the ATM switching system, the call control part 200 performs a general operation for assigning VPI and VCI information placed in a header area of a cell, in response to a connection requirement of a call. To perform such operations, the call control part 200 is connected to the line interface part 130 and the trunk interface part 140 within the switching system through lines L1 and L2. In response to a connection requirement of a call from either the line interface part 130 or the trunk interface part 140, the call control part 200 generates a clock CK2 and a read control signal R CLOCK and transfers the information values read from the FIFO memory 210 to lines L1 and L2. In response to a releasing requirement of a call, the call control part 200 generates a clock CK1 and a write control signal W CLOCK and applies the information values used for the call required in releasing to the FIFO memory 210. The FIFO memory 210 stores only the predetermined VPI and VCI values in response to the write control signal W CLOCK of the call control part 200 and reads the stored VPI and VCI values in response to the read control signal R CLOCK. Substantially, write and read terminals of the FIFO memory 210 may be divided respectively. FIFO memory 210 as shown in FIG. 2 includes an empty terminal EF for showing a data storage status of the memory. If necessary however, the FIFO memory 210 may further include a full flag, a almost-full flag, a half-full flag or a almost-empty flag in order to allow the controlling circuitry to accurately monitor the internal data storage status of the FIFO memory before every writing or reading process. If the FIFO memory 210 does not have such empty, full, and half flags, data storage status may also be determined by making a comparison with a number of read and write operations of the FIFO memory 210 in view of its capacity. For instance, a separate circuit may be used to make such comparison. In designing a memory having a FIFO function, however, it would be more desirable to include a flag for the purpose of indicating a data storage status of the memory. Further, FIFO memory 210 is applications specific; thus, its storage size varies dependent upon specific types of applications. For most parts, the FIFO memory 210 may store up to several thousand VPI and VCI values at any one time. The FIFO memory 210 itself may be selected from any one of a clocked FIFO type, strobe FIFO type, a synchronous FIFO type or an asynchronous FIFO type. An asynchronous FIFO memory is more desirable however, because it allows writing of data to be taken place completely asynchronously to reading. In present embodiments, in a case of a UNI structure, the FIFO memory 210 has a storage size of about 48 Mega bytes in order to store all information. In a case of a NNI structure, the FIFO memory 210 has a storage size of about 1 G Byte. Latch circuits 211 and 212 are connected to input/output terminals D1 and D0 of the FIFO memory 210, for latching information values in response to the clocks CK1 and CK2, respectively. Latch circuits 211 and 212 may be embodied by conventional D-type flip-flops.

Figure 3A:
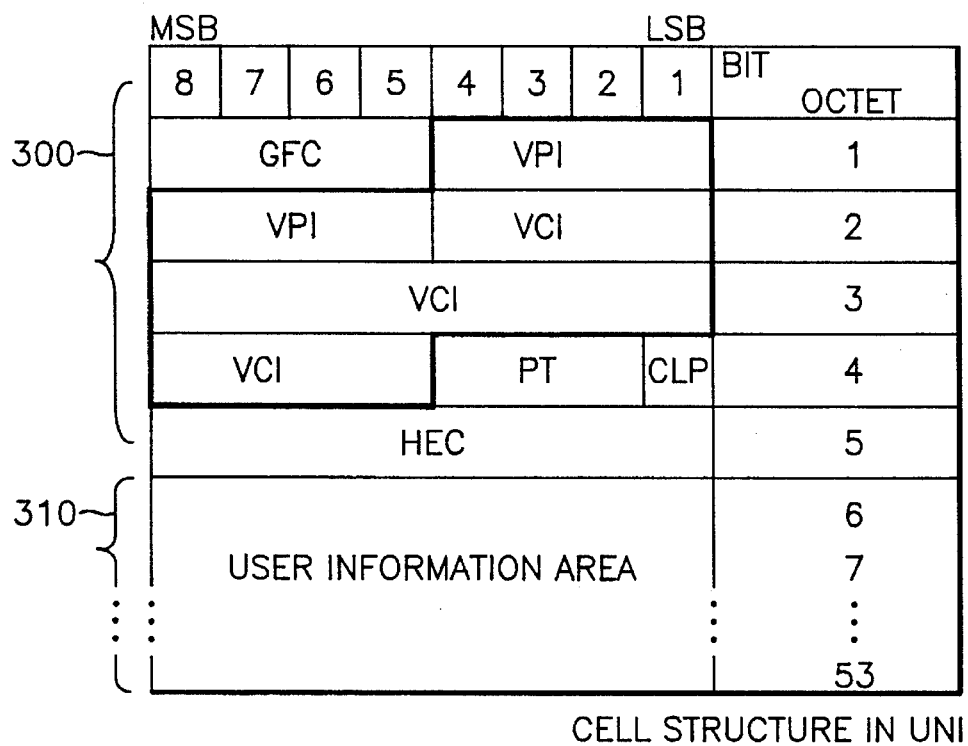
FIG. 3A illustrates one structure of an ATM cell according to the present invention.
Figure 3B:
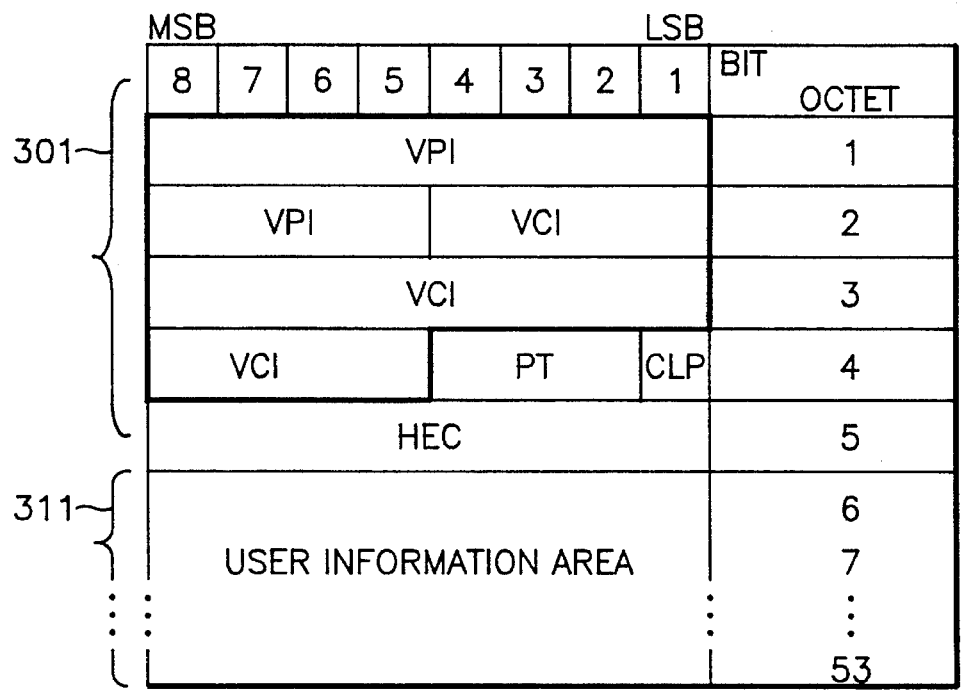
FIG. 3B illustrates another structure of an ATM cell according to the present invention.

In FIGS. 3A and 3B, two types of ATM cell structure of the present invention are illustrated in accordance with CCITY recommendation I.361. FIG. 3A shows an ATM cell structure compatible with a UNI and is used in conjunction with the LIU 130 shown in FIG. 1. FIG. 3B shows an ATM cell structure compatible with a NNI and is used in conjunction with the TIU 140 shown in FIG. 1.

Referring to FIG. 3A, each ATM cell compatible with a UNI has a total of 53 bytes, and includes a header area 300 of 5 bytes and a user information area 310 of 48 bytes. Header area 300 is comprised of a generic flow control field (GFC), a payload type field (PT), a cell loss priority field (CLP), a header error control field (HEC) as well as VPI and VCI fields, and is used to identify ATM cells belonging to the same virtual channel on an asynchronous time division multiplex.

In the above configuration, each ATM cell is assigned with a virtual path number represented by a VPI value and a virtual channel number represented by a VCI value. A flow of ATM cells assigned with the same virtual path number logically forms a virtual path. Also, a flow of ATM cells assigned with the same virtual path number and the same virtual channel number logically forms a virtual channel. Within the header area 300, 4 bits are assigned to the GFC field for controlling traffic flow from the subscriber. VPI field is assigned with 8 bits for identifying one of logical paths multiplexed on a transmission line. VCI field is assigned with 16 bits for identifying one of logical connections multiplexed on one logical path. PT field is assigned with 3 bits for identifying whether the cells comprise user information or communication network information. CLP field is assigned with 1 bit for indicating a priority of cell loss. Finally, HEC field is assigned 1 byte for error correction on the header. Thus, in a UNI, a total bit number assigned to VPI and VCI field is 24 bits.

Referring to the FIG. 3B, each ATM cell compatible with a NNI also has a total of 53 bytes, and includes a header area 301 of 5 bytes and a user information area 311 of 48 bytes. The total bit number assigned to VPI and VCI is 28 bits.

Figure 4:
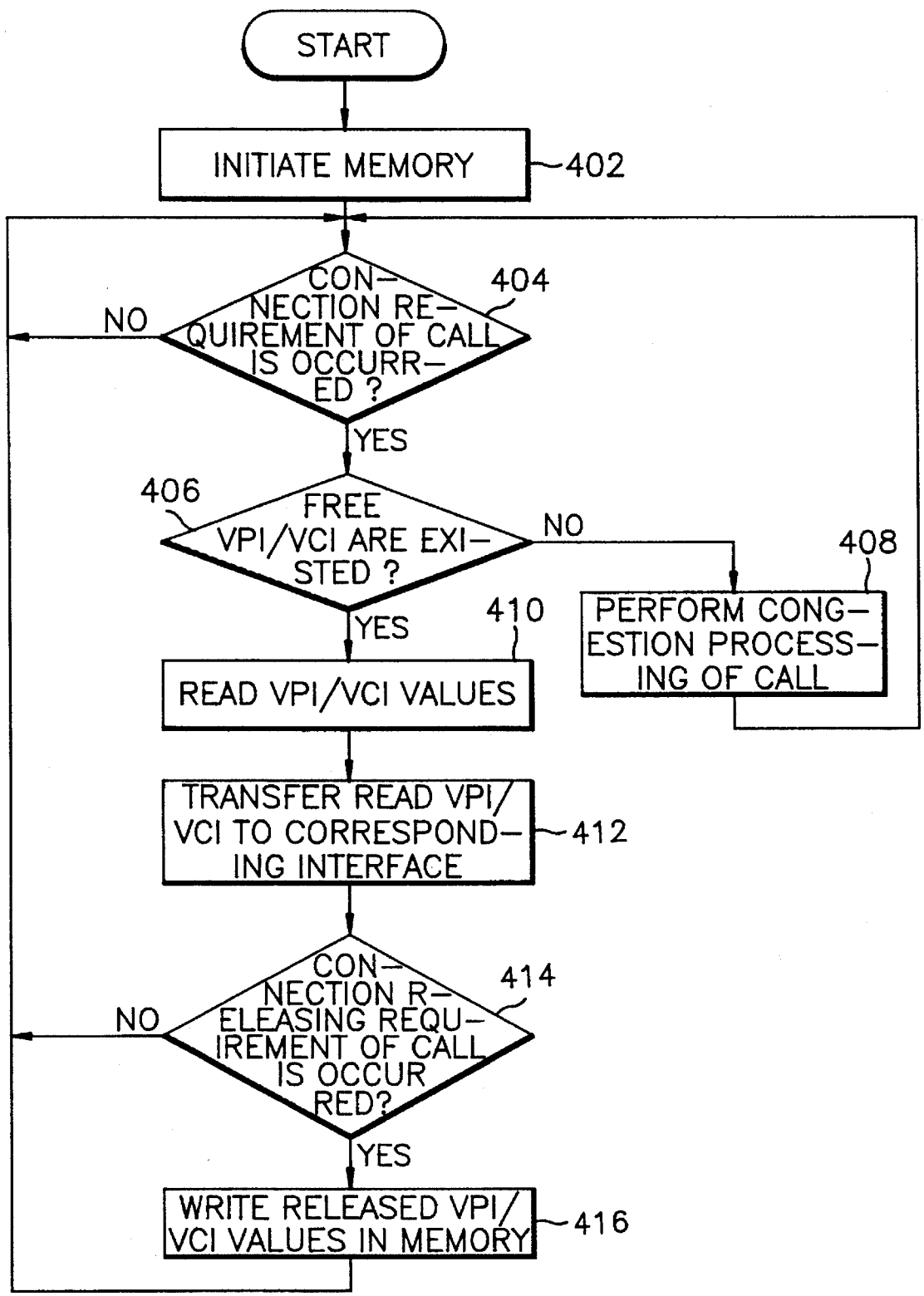
FIG. 4 is a flow chart for executing a VPI and VCI assignment according to one embodiment of the present invention.

Circuit operations of FIG. 2 are implemented according to a control flow of FIG. 4. That is, the call control part 200 of FIG. 2 performs a process shown in FIG. 4 for assigning the VPI and VCI information in a cell header in response to an input call, specially without searching for header information under a "free status." Referring now to FIG. 4, in step 402, the call control part 200 initiates and sets predetermined VPI and VCI values in the FIFO memory 210. Subsequently in step 404, the call control part 200 checks whether there is a call connection input from lines L1 and L2. If a connection requirement of a call occurs in step 404, step 406 is performed to check a data storage status of the FIFO memory 210. That is, the call control part 200 checks the current storage status of the FIFO memory 210 from the empty terminal EF, to determine whether the VPI and VCI values of a "free status" are available in the FIFO memory 210. If the FIFO memory 210 stores such VPI and VCI values, the call control part 200 reads the VPI and VCI values in step 410. If the FIFO memory 210 does not store the VPI and VCI values under a "free status," the call control part 200 proceeds to step 408 to execute a congestion processing of a call in case where there is no more header information to be assigned. In step 410, the reading operation of the VPI and VCI values is realized by applying a read control signal R CLOCK to the FIFO memory 210, and then applying a clock CK2 to the latch 212 in order to enable the latch 212 to latch the output of the FIFO memory 210 to line L22 via the call control part 200. Thus, the latch 212 temporarily holds the read VPI and VCI values until a next instruction. In step 412, the read VPI and VCI information values, i.e., the output of the latch 212, are then transferred to the interface parts corresponding to the connection requirement through lines L1 and L2. Either the LIU 130 or TIU 140 which requires a call connection, receives the read VPI and VCI information values and inserts the VPI and VCI information values to a header area of ATM cells as shown in either FIG. 3A or FIG. 3B, respectively. In step 414, the call control part 200 checks whether a releasing requirement of a call for connection occurs. In step 416, the call control part 200 writes the VPI and VCI information values used for a call into the FIFO memory 210 when a releasing requirement of the call occurs. In step 416, the writing operation is realized by applying a clock CK1 to the latch 211, prior to the application of a write control signal W CLOCK to the FIFO memory 210. The released VPI and VCI information values are then latched by the latch 211 and subsequently stored in the FIFO memory 210 in response to the write control signal W CLOCK.

In accordance with one embodiment of the present invention, depending on the essential function of the FIFO memory 210, the VPI and VCI information values under a "free status" are read within the FIFO memory 210 in its sequential written order. That is, the VPI and VCI values that had been first written onto the FIFO memory 210 will be first assigned to the subscriber in response to the first connection request; and the next VPI and VCI values written onto the FIFO memory 210 will be assigned next and so on. Thus, in view with the foregoing VPI and VCI values assignment scheme, there is no need to separately search for the VPI and VCI information values under a "free status." The present invention advantageously endows the call processing unit the ability to search for the virtual path and virtual channel identifiers under a "free status," at high speed, without burdening a processing speed of a call transferred in the ATM switching system.

While preferred embodiments of the present invention have been particularly shown and described, it will be understood by those skilled in the art that foregoing and other changes in form and details may be made without departing from the spirit and scope of the present invention as defined in the appended claims. As described above, the present invention has an advantage in improving the assignment of cell information in an asynchronous transfer mode.

What is claimed is:

1. A method for assigning header information in a header area of asynchronous transfer mode cells in response to a call connection in an asynchronous transfer mode switching system having a plurality of pairs of input and output lines operatively connected to corresponding interface means, for selectively switching a plurality of transmission lines and enabling inter-terminal communications, said method comprising the steps of:

setting predetermined header values in a first-in-first-out memory;

making a determination of a storage status of said first-in-first-out memory when a call connection is required;

transferring stored header values to said interface means corresponding to said call connection, after reading said stored header values from said first-in-first-out memory in dependence upon said determination; and storing header values in said first-in-first-out memory when a call release occurs.

2. The method as claimed in claim 1, further comprised of said header values representing virtual path identifiers for identifying different ones of virtual paths and virtual channel identifiers for identifying different ones of virtual channels in a corresponding virtual path, for enabling inter-terminal communications in said asynchronous transfer mode switching system.

3. The method as claimed in claim 2, further comprising the step of congestion processing of a call when the storage status of said first-in-first-out memory indicates an empty state.

4. A method for indicating header values to be placed in a header area of communication data, in response to a connection requirement of a call input, in an asynchronous transfer mode switching system having a plurality of pairs of input and output lines operatively connected to corresponding interface means, for selectively switching a plurality of transmission lines and enabling inter-terminal communication between subscribers, said method comprising the steps of:

setting header values in a first-in-first-out memory;

checking a congestion state of said first-in-first-out memory when a connection requirement of said call occurs;

transferring stored header values to said interface means corresponding to said connection requirement, after reading said stored header values from said first-in-first-out memory when said first-in-first-out memory is not in the congestion state; and writing said header values used for a call required in releasing when a releasing requirement of said call occurs, in said first-in-first-out memory.

5. The method as claimed in claim 4, further comprised of said header values representing virtual path identifiers for identifying different ones of virtual paths in a transmission line and virtual channel identifiers for identifying different ones of virtual channels in a corresponding virtual path, for enabling inter-terminal communications in said asynchronous transfer mode switching system.

6. An apparatus for assigning, in correspondence with a connection requirement of a call, header values to be placed in a header area of communication data cells in a switching system having a plurality of pairs of input and output lines operatively connected to corresponding interface means, for selectively switching a plurality of transmission lines and enabling inter-terminal communications, said apparatus comprising:

a memory having a first-in-first-out function, for storing header values in response to a write control signal and for providing stored header values in response to a read control signal;

latch means connected to an input and output terminal of said memory, for latching the header values in response to a clock signal; and control means connected to said interface means within said switching system, for generating said clock signal and said read control signal in response to said connection requirement of a call from the corresponding interface means, for transferring the header values read from said memory to the corresponding interface means, for generating said clock signal and said write control signal in response to a releasing requirement of a call, and for applying the header values used for a released call to said memory.

7. The apparatus as claimed in claim 6, further comprised of said header values representing virtual path identifiers for identifying different ones of virtual paths in a transmission line and virtual channel identifiers for identifying different ones of virtual channels in a corresponding virtual path, for enabling inter-terminal communications in switching system.

8. The apparatus as claimed in claim 6, further comprised of said latch means being pair of D-type flip-flops connected to input and output terminals of said memory, for latching the header values to be written onto said memory in response to said clock signal of a first state and latching the header values read from said memory in response to said clock signal of a second state.

9. The apparatus as claimed in claim 6, further comprised of said switching system being an asynchronous transfer mode switching network and said communication data cells being asynchronous transfer mode cells.

10. A broadband communication system, comprising:

a plurality of interface means each for communicating with a corresponding pair of transmission lines;

switch means having a plurality of pairs of input and output lines operatively connected to said corresponding plurality of interface means, for selectively switching between the plurality of transmission lines and for enabling inter-terminal communication between subscribers; and header assignment means for assigning, in correspondence with a connection requirement specified by a call, header values to be placed in a header area of communication data, said header assignment means comprising:

a memory having a first-in-first-out function, for storing header values in response to a write control signal and for outputting stored header values in response to a read control signal;

latch means connected to input and output terminals of said memory, for latching the header values in response to a clock signal; and call control means connected to said plurality of interface means, for generating said clock signal and said read control signal in response to said connection requirement from the corresponding interface means, for transferring the header values read from said memory to the corresponding interface means, for generating said clock signal and said write control signal in response to a releasing requirement of said call, and for applying the header values used for said call required in releasing to said memory.

11. The broadband communication system as claimed in claim 10, further comprised of said header values representing virtual path identifiers for identifying different ones of virtual paths in a transmission line and virtual channel identifiers for identifying different ones of virtual channels in a corresponding virtual path in correspondence with said call, for enabling inter-terminal communications in said broadband communication system.

12. The broadband communication system as claimed in claim 10, further comprised of said latch means being a pair of D-type flip-flops connected to input and output terminals of said memory, for latching the header values to be written onto said memory in response to said clock signal of a first state and latching the header values read from said memory in response to said clock signal of a second state.

13. The broadband communication system as claimed in claim 10, further comprised of said switch means being an asynchronous transfer mode switching network and said communication data being asynchronous transfer mode cells.

14. A broadband communication system, comprising:

line interface means for interfacing with a plurality of subscriber lines from corresponding subscriber terminals;

trunk interface means each for interfacing with a plurality of trunk lines from a communication channel;

asynchronous transfer mode switch means having a plurality of pairs of input and output lines operatively connected between said line interface means and said trunk interface means, for selectively switching between subscriber lines for enabling inter-terminal communication between of subscribers, and for enabling communication with another broadband communication system via said communication channel; and header assignment means for assigning, in correspondence with a connection requirement of a call, header values to be placed in a header area of asynchronous transfer mode cells, said header assignment means comprising:

a memory having a first-in-first-out function, for storing header values in response to a write control signal and for outputting stored header values in response to a read control signal;

call control means operatively connected between said line interface means and said trunk interface means, for generating said write control signal and a first clock signal in response to a releasing requirement of said call for enabling the header values to be written onto said memory, and for generating said read control signal and a second clock signal in response to said connection requirement of said call from one of said line interface means and said trunk interface means for enabling the header values to be read from said memory to one of said line interface means and said trunk interface means, said one of said line interface means and said trunk interface means receiving and applying the header values read from said memory in the header area of said asynchronous transfer mode cells;

first latch means for latching the header values to be written onto said memory in response to said first clock signal; and second latch means for latching the header values read from said memory in response to said second clock signal.

15. The broadband communication system as claimed in claim 14, further comprised of said header values representing virtual path identifiers for identifying different ones of virtual paths in a transmission line and virtual channel identifiers for identifying different ones of virtual channels in each virtual path corresponding to the call, for enabling communications in said asynchronous transfer mode switching system.

16. The broadband communication system as claimed in claim 14, further comprised of said first and second latch means each being a D-type flip-flop.

17. An apparatus for selecting free cell header values to uniquely identify a call connection between parties over a communications network utilizing an asynchronous transfer mode, comprising:

memory means for storing in contiguous memory locations cell header values not under assignment to a call connection; and control means for supplying unassigned cell header values to said memory means in response to a call release requirement, and for assigning cell header values retrieved from said memory means to asynchronous transfer mode cells corresponding to a call connection in response to a call connection requirement.

18. The apparatus of claim 17, further comprising:

said memory means storing and retrieving said cell header values on a first-in-first-out basis; and said control means supplying said memory means with a write control signal in response to a said call release requirement, and supplying said memory means with a read control signal in response to a said call connection requirement.

19. The apparatus of claim 17, further comprised of said cell header values representing at least one of a virtual path identifier and a virtual channel identifier corresponding to an address in a header conversion table for storing a route for said call connection through the communication system.

20. A method for selecting unassigned cell header values to uniquely identify call connections between parties over a communications network utilizing an asynchronous transfer mode, the method comprising:

supplying to a storage medium a plurality of cell header values not under assignment to a call connection, each said cell header value being supplied in response to a respective call release requirement;

storing said plurality of unassigned cell header values in contiguous memory locations in said storage medium; and assigning a cell header value retrieved from said storage medium to asynchronous transfer mode cells corresponding to a call connection in response to a call connection requirement, a plurality of said cell header values being assigned in response to successive call connection requirements.

21. The method of claim 20, further comprising retrieving said plurality of cell header values from said storage medium on a first-in-first-out basis.

22. The method of claim 20, further comprised of each of said cell header values representing at least one of a virtual path identifier and a virtual channel identifier corresponding to an address in a header conversion table storing routes for a plurality of said call connections through the communication system.

* * * * *